July 11, 1961

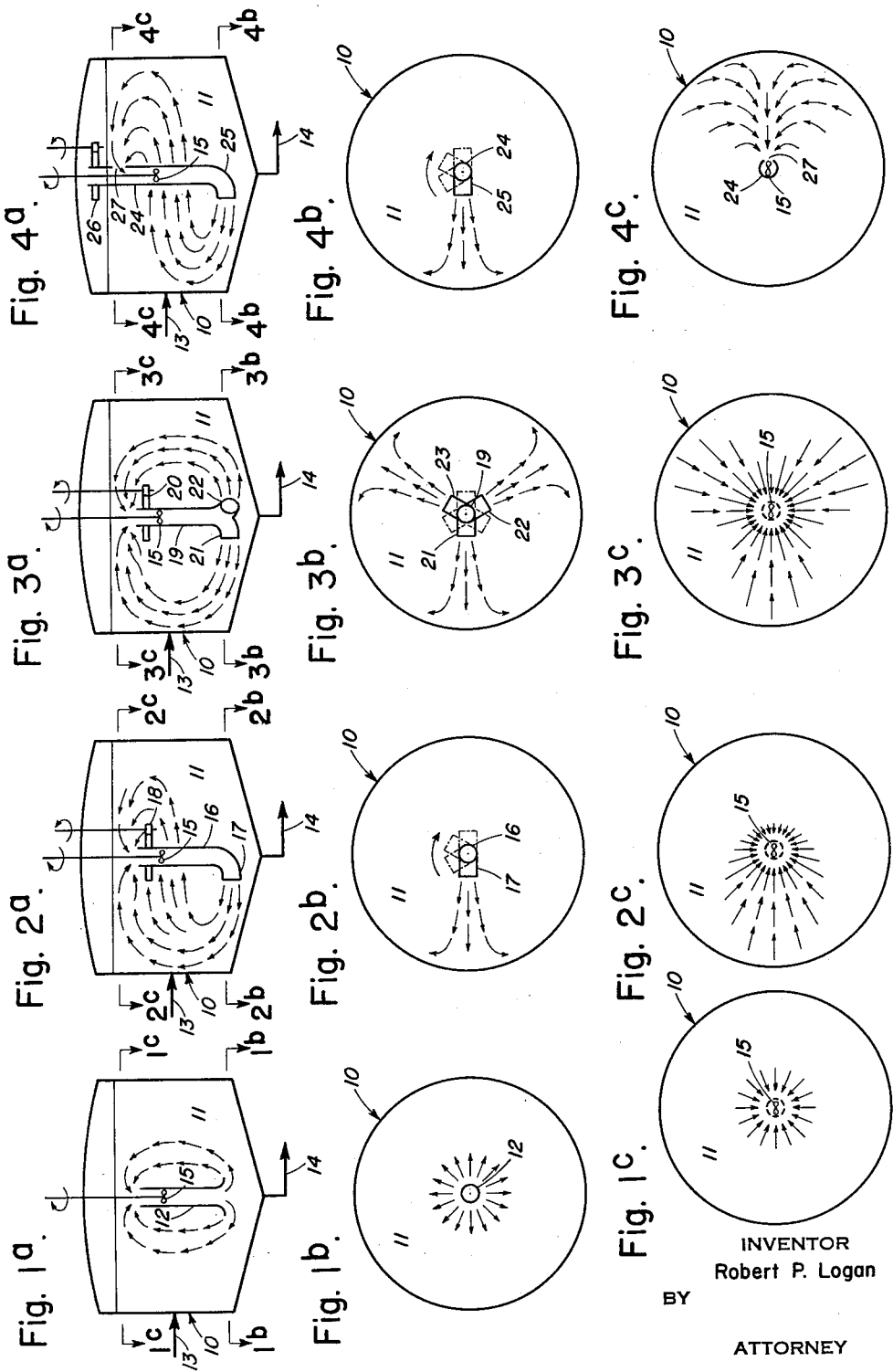

R. P. LOGAN 2,991,983

SLUDGE TREATMENT

Filed Sept. 21, 1956

INVENTOR
Robert P. Logan
BY
ATTORNEY

United States Patent Office 2,991,983
Patented July 11, 1961

2,991,983
SLUDGE TREATMENT
Robert P. Logan, Westport, Conn., assignor to Dorr-Oliver Incorporated, Stamford, Conn., a corporation of Delaware
Filed Sept. 21, 1956, Ser. No. 611,314
4 Claims. (Cl. 259—97)

This invention relates to a method and means for mixing or stirring sludge tanks. More particularly, it relates to a method and means for achieving high efficiency mixing in sewage sludge digestion tanks through the utilization of one or more rotating high velocity sludge streams.

Recent developments in the art of sewage sludge digestion have shown that material functional improvements can be attained through the use of a relatively thick or thickened sludge feed to the digestion tank or step. It is evident that a concentration of the sludge to say one-half its ordinary or original volume will bring about a corresponding reduction in the required size of the digestion tank. As a matter of fact, however, for various bio-chemical reasons, the digestion process per se is markedly accelerated by the use of a thick sludge and the required digester volume is, accordingly, still further reduced.

The advent of these new processes has, however, drawn attention to the role of tank volume utilization in the digestion process. It was found, for one thing, that the extraordinary results attained in laboratory tests could not be reproduced in field installations. In tracking down the cause of this disparity, numerous tests have been run and the results have indicated strongly that the chief cause is the inability of equipment heretofore available to adequately utilize the tank volume. It has, for example, been found that the effective detention time in an unmixed digester is only one-third the theoretical detention time as computed from total tank volume and rate of feed. Forced mixing by means of draft tube mixers and similar devices doubles the effective volume utilization to two-thirds of that theoretically attainable, but even this expedient leaves a third of the available volume unused.

The most common mixing means encountered in present day practice comprises some adaptation of the draft tube principle, whereby the tank contents are drawn into the draft tube at one level within the tank, impelled vertically in an upward or a downward direction and discharged at a second level. The principle of operation is manifestly to produce an overall movement of the tank contents whereby intimate mixing is promoted. Practical considerations have, however, rendered the attainment of this objective virtually impossible. Not only would power requirements be exorbitive, but there are structural and functional limitations present which bar the provision of means actually capable of producing continuous overall movement. As a result, the tank contents tend to short-circuit between the outlet and the inlet of the draft tube, and the flow pattern produced is such as to leave significant portions of the tank unaffected by the mixing or circulating means.

As may be inferred from the foregoing, it is the principal object of this invention to provide a method and means for attaining substantially complete volumetric tank utilization through improved mixing techniques and apparatus.

More particularly, it is an object of this invention to attain this end without necessitating any substantial increase in power requirements.

These and other objects are achieved, according to this invention by the double expedient of forming the discharge from a draft tube type mixer into one of more high velocity jets directed radially outward from the axis of the draft tube into the sludge body, and by rotating the jet or jets about the vertical axis of the draft tube in order that, during each rotational cycle, it will completely sweep a transverse section of said sludge body and produce violent, but, at any given instant, localized mixing thereof. The mixing energy supplied is, consequently, not dissipated in a futile attempt to move the entire sludge body, but is restricted to a relatively small portion thereof. Furtheremore, through proper direction and disposition of the jet, it can be caused to exert its effect in remote regions of the sludge body not heretofore reached by the conventional mixing means.

The underlying concept of this invention may perhaps be best illustrated by analogy with the effect of placing a reflector behind a light source. Energy emanating from such a source varies in intensity inversely as the square of the distance from the source. Rendering the bulk of the energy unidirectional through the provision of suitable concentrating means, a reflector in the case of light energy, will increase the energy in the narrowed zone into which the unidirectional beam is directed in direct linear proportion to the amount of concentration achieved. Thus, visualizing the stream emanating from a standard centrally disposed draft tube as comprising a relatively planar horizontal stream directed radially in a full 360 degree arc toward the periphery of the sludge tank, it may be seen that a concentration of this stream into say a 10 degree arc will produce, theoretically, a 36 fold increase in the instantaneous magnitude of the energy available at the tank periphery. Various hydraulic factors such as viscosity, shear, turbulence etc., will tend to materially reduce this theoretical value. Nevertheless, it is clear that very great increases in instantaneous energy magnitude at the tank periphery can be attained.

It should be noted at this point that it is not the purpose of this invention to increase the total amount of energy supplied to the sludge for mixing. As a matter of fact, total energy requirements may very well be reduced. In any event, no more energy is furnished to any given angular sector of the tank than heretofore. What this invention does accomplish, and for the first time, is the provision of intermittent, but concentrated, mixing energy to all portions of the tank volume and thereby brings about a very material rise in the overall functional efficiency of the unit by eliminating regions of stagnation and by assuring the intimate mixing of new feed with the sludge body undergoing treatment.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

FIGURES 1a through 4a are schematic cross-sectional elevations through sludge tanks and show the flow patterns achieved with various types of mixers.

FIGURES 1b through 4b are schematic cross-sectional plans taken at sections 1b—1b through 4b—4b of the respective 1a through 4a views.

FIGURES 1c through 4c are schematic cross-sectional plans taken at sections 1c—1c through 4c—4c of the respective 1a through 4a views.

Figure 5:
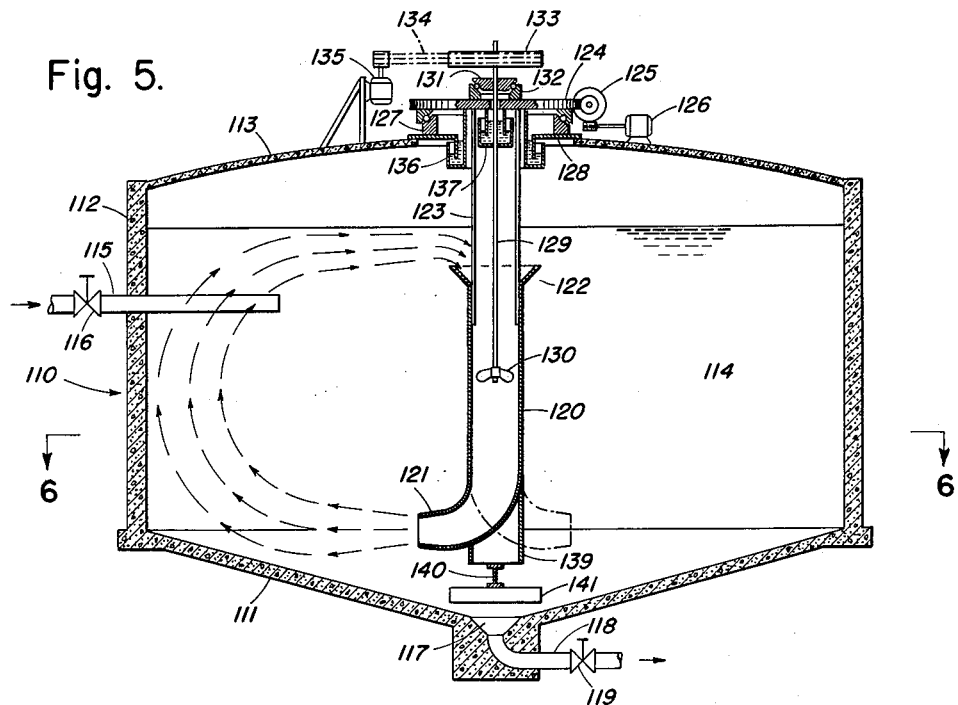
FIGURE 5 is a cross-sectional elevation of one preferred embodiment of this invention.

FIGURE 1a represents a sludge tank shown generally at 10, containing a sludge body 11 and centrally disposed draft tube 12 of the conventional downflow type with propeller 15, the driving means for which is not shown. Raw feed enters by way of conduit 13, and treated effluent is withdrawn by way of conduit 14. Sludge is mixed and circulated by drawing surface proximate material into the top of the draft tube, impelling it downwardly by means of propeller 15 and discharging it back into sludge body 11 in a generally downward direction. It should be noted at this point that there have been instances wherein structural means have been provided for deflecting sludge re-entering the main body to cause the stream to travel horizontally or substantially so. In each case however, it was the purpose and effect of the apparatus to induce overall continuous movement of the tank contents and was, therefore, subject to the shortcoming which the invention dealt with herein is designed to overcome.

FIGURES 1b and 1c show, respectively, the flow patterns produced in the region of the draft tube discharge and in the region of the draft tube intake. In the former case the pattern shows a uniform, outwardly radial flow of equal velocity magnitudes. In the latter case, similarly the pattern shows a uniform, inwardly radial flow of uniform magnitudes.

FIGURE 2a represents, schematically, a digestion tank incorporating the basic embodiment of this invention. As in the FIGURES 1a–1c embodiment, raw feed enters tank 10 by way of conduit 13 and treated effluent is withdrawn by way of conduit 14. The means for mixing sludge body 11 comprises, in this case, a rotatable draft tube 16, adapted through the provision of a flow directing means 17, to discharge sludge impelled downwardly therethrough by propeller 15, as a rotating, substantially unidirectional stream having a relatively high velocity vector in the direction of the tank periphery. It may be noted at this point that while said flow directing means 17 is shown as a nozzle, it could take other forms such as, for example, an orifice. Torque applying means, shown generally at 18, the drive means for which is not shown, serves to produce rotation of the draft tube, and consequently of the directed sludge stream, through a full 360 degree arc.

The flow pattern shown in FIGURES 2a, 2b and 2c are of interest and significance. It may be observed in FIGURES 2a and 2b that the sludge stream from the draft tube will, under normal circumstances, retain its identity for some distance, and will, as a matter of fact, be designed to reach to the tank periphery and exert a definite scouring effect in the region of the tank remote from the central axis. After being deflected upwardly by the peripheral wall of tank 10, it will tend to expand in cross-section, carrying with it significant portions of sludge body 11. By the time it reaches the region of the draft tube inlet, the pattern will have the general transverse configuration shown in FIGURE 2c. The net effect therefore, is to produce violent, but localized mixing of sludge in the sector toward which the draft tube sludge stream is directed, together with a displacement of the sludge so mixed toward the draft tube inlet. During the course of the rotational movement of the draft tube, each sector of the sludge tank comes periodically under the influence of the sludge stream, and undergoes similar mixing and sludge displacement. As a result, there is substantially no possibility that significant volumes of sludge will remain stagnant and thereby reduce effective tank volume. Reverting for a moment to the configuration of the transverse inlet flow pattern as shown in FIGURE 2c, it should be pointed out that the inequality of the velocity vectors produces a very desirable effect. The fact that there will be a relatively strong, localized movement of surface proximate sludge toward the draft tube inlet will be helpful in moving surface scum toward and into the draft tube, where it will be disintegrated and eventually re-dispersed into sludge body 11.

FIGURES 3a, 3b and 3c illustrate an embodiment similar to the FIGURES 2a–2c embodiment, but utilizing a draft tube with a plurality of flow directing means 21, 22, and 23. The remaining elements are substantially similar to those shown in FIGURE 2. Thus, the sludge tank shown generally at 10 and containing sludge body 11 receives raw feed by way of conduit 13 and discharges treated effluent by way of conduit 14. Propeller 15 serves to impel sludge downwardly through rotatable draft tube 19, whence it passes into the sludge body by way of said flow directing means 21, 22 and 23. Torque furnishing means shown generally at 20 serves to rotate the draft tube and the flow directing means about a common vertical axis. The drive means for propeller 15 and torque furnishing means 20 are not shown.

The overall effect of each of the sludge streams of the FIGURES 3a–3c embodiment is generally similar to that of the single stream of the FIGURES 2a–2c embodiment. Each will serve to sweep through the sector through which it is directed at any given moment and to displace the contents of that sector toward the inlet of the draft tube. There are, however, several advantages which accrue from the use of a plurality of directed streams. In the first place, it may be used to minimize, or, as a matter of fact, to substantially eliminate the unbalanced force on the draft tube produced by the reaction to the lateral discharge of a single sludge stream. Secondly, the frequency of passes through any given sector can be increased without increasing the rotational velocity of the draft tube. And, lastly, it facilitates the design of rotating means adapted to rotate the draft tube through an arc of less than 360 degrees and then to reverse itself back though the same arc. Thus, in the embodiment of FIGURE 3, with three flow directing means, should engineering considerations render such expedient desirable, the draft tube could be sequentially rotated through 120 degrees, reversed, and rotated back through the 120 degrees, the effect of the three flow directing means being to sweep all 360 degrees of the tank twice during each full cycle.

The surface proximate flow pattern illustrated in FIGURE 3c has the appearance of a plurality of lobes corresponding in number to the number of flow directing means. The scum removing effect of the relatively high velocities represented by each lobe will be substantially similar to those dealt with in the description of the FIGURE 2 embodiment.

FIGURES 4a, 4b and 4c represent another embodiment of the basic concept involved herein, but is specifically adapted to enhance scum removal. It departs from the FIGURES 2a–2c embodiment only in that the inlet to the draft tube is restricted to produce a relatively strong, generally unidirectional flow at or near the surface of the sludge body 11 whereby material floating on the surface of said sludge body is forcibly impelled into the draft tube for disintegration and re-immersion in said body. A sludge tank shown generally at 10, and containing said sludge body 11 again receives raw sludge by way of conduit 13 and discharges treated effluent by way of conduit 14. Draft tube 24, rotated by torque furnishing means 26, laterally encloses sludge impelling means 15 which produces a downward movement of sludge through said draft tube, and lateral discharge through flow directing means 25. The design of draft tube 24 departs however, from that of the FIGURE 2 embodiment in that it extends above the level of sludge body 11 and contains at least one opening or port 27 at or near the level of the surfaces of said liquid body through which sludge entering the draft tube must pass. FIGURE 4c illustrates the surface proximate flow pattern created by such a port and demonstrates its flow concentrating effects. It should also be noted in FIGURE 4a that in those instances where a draft tube having a single sludge discharge directing means and a single, oppositely disposed, sludge inlet means is used, a cross-over of sludge from one side of the tank to the other can be attained and homogeneity of the sludge body may thereby be further enhanced.

Figure 6:
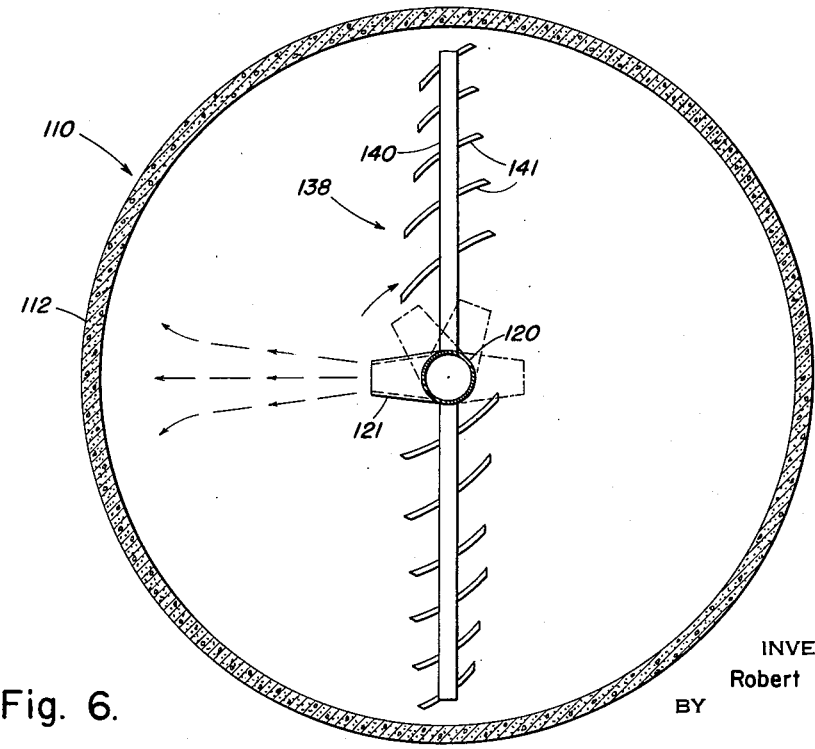
FIGURE 6 is a cross-sectional plan of the FIGURE 5 embodiment taken at section 6—6 thereof.

The apparatus shown in FIGURES 5 and 6 represent an operative embodiment of the invention dealt with herein. A sludge tank shown generally at 110 and comprised of bottom 111, peripheral wall 112 and top 113, contains a body of sludge 114 undergoing treatment. Conduit 115 with associated valve 116 serves to admit raw sludge feed to said body, while bottom sump 117, discharging through conduit 118 with associated valve 119 serves to withdraw treated sludge. Rotatable draft tube 120, shown axially mounted within tank 110, terminates, at its lower end, in flow directing means 121 which in this embodiment, comprises a single laterally directed nozzle, and at its upper end in a flared intake 122. Supporting members 123, fixedly attached both to drive gear 124 and draft tube 120, serve not only as supporting means for said draft tube, but also for transmitting rotational torque thereto; gear assembly 125 actuated by drive means 126 acting to supply rotational torque to said drive gear 124. Annular thrust bearing 127, mounted on sludge tank closure plate 128, comprises supporting means for drive head 124 and the entire assembly dependent therefrom. Shaft 129 which supports and rotates impelling means 130 is fitted with a flange 131 which engages and is retained in position by annular thrust bearing 132 mounted on drive gear 124. A sheave 133 is provided at the top of shaft 129 for receiving motive torque from a belt 134 actuated by drive means 135. In order to prevent the passage of gaseous material to or from tank 10, seals of the liquid type shown generally at 136 and 137 are provided; the former acting to isolate the draft tube assembly from atmosphere, and the latter performing the same role with regard to the impeller assembly.

As an added element of the apparatus, rotating rake means are provided as shown generally at 138. Supported from the draft tube by means of cylindrical member 139, said rake means comprises a rigid supporting member 140 and rake blades 141 mounted on the underside of said supporting member. Motive torque for rotating said rake assembly is derived from rotating draft tube 120 through said cylindrical member 139.

For the purposes of the following discussion of the operation of the apparatus shown in FIGURES 5 and 6, it will be assumed that the treatment being carried out is the anaerobic bacterial digestion of an organic sludge such as is encountered in sewage treatment processes. Raw sludge feed entering sludge body 114 by way of conduit 115 will promptly be subjected to the initial stages of bacterial decomposition. Were this material not mixed at all, it would, ultimately, be completely broken down into inert, inoffensive matter. Practical considerations however, bar any such practice at most modern installations since the capacity required to hold the material for the necessary period of time would be extremely great. Consequently, as discussed hereinabove, provision for mixing the tank contents to bring newly entering material into intimate contact with active bacterial organisms, and, conversely, to maintain an active bacterial population by rendering the food supply continuously and uniformly available, is substantially a universal requirement.

According to the teachings of this invention, material is drawn from one level in sludge body 114 into the intake 122 of a vertically disposed rotating draft tube 120, is impelled therethrough by means such as that shown at 130, and is discharged back into sludge body 114 at a second level in the form of a relatively high velocity rotating stream directed radially outwardly from the axis of draft tube 120; said stream being formed and directed by some means associated with or comprising part of said draft tube such as nozzle 121. It is important to note at this point that although the drawings and the foregoing discussion have dealt with only draft tubes of the down-flow type, the advantages accruing from this invention can, in part, also be realized through the use of an upflow draft tube wherein the level of the directed stream is disposed above that of the draft tube intake.

In the FIGURE 5 embodiment the stream issuing from flow directing means 121, will, as indicated by the directional arrows, pass generally along the tank bottom 111 until it reaches the region of peripheral wall 112, at which point it will be directed upwardly. In the region of the surface of sludge body 114, it will once more be deflected, this time inwardly toward draft tube inlet 122. Consequently, the generally wedge-shaped sector through which the sludge is passing at any given time is thoroughly and violently mixed, and the contents thereof displaced toward the draft tube inlet 122 for redistribution within the tank. As the draft tube continues to rotate, various other instantaneous positions of the flow directing means 121 being shown by dashed lines in FIGURES 5 and 6, each portion of sludge body 114 will, during each revolution, be subjected to this violent agitation and displacement, and the possible formation of sludge deposits will, for practical purposes, be eliminated.

Rake means 138 is provided in the FIGURES 5 and 6 embodiment primarily for the purpose of avoiding the accumulation of heavy inorganic particles generally referred to as grit, on tank bottom 111. Moving at the same rotational velocity as draft tube 120, rake blades 141 act to transport the grit to central sump 117 from which it is discharged, together with treated sludge, through conduit 118.

I claim:

1. Apparatus for the treatment of sludge which comprises a closed tank adapted to contain a body of sludge undergoing digestion, conduit means for introducing raw sludge to said tank, conduit means for discharging treated sludge from said tank, a draft tube disposed within said tank and in hydraulic communication with said sludge body at least at two vertically spaced levels, means for inducing the flow of a stream of sludge through said draft tube downwardly comprising a propeller having a shaft, flow directing means structurally associated with said draft tube for directing at least one unidirectional stream of the sludge issuing from said draft tube in a direction oriented generally towards the corner formed by the walls and by the bottom of the tank and generally radially away from said draft tube and substantially normal to the periphery of said tank, said confined stream effective when said draft tube is rotated about its vertical axis to resuspend solids from consecutive bottom corner portions of the tank incident to the rotation of said unidirectional stream while floating scum is adapted to be drawn into said draft tube from the top, a bull gear for rotating said draft tube, structural means extending through the roof of the tank and rigidly connecting said bull gear with said draft tube in coaxial relationship therewith, and annular thrust-bearing means for rotatably supporting said bull gear upon said roof, auxiliary bearing means for rotatably supporting said propeller shaft concentric relative to said gear, and gas sealing means effective between said bull gear and said roof.

2. The apparatus according to claim 1, wherein said gas sealing means comprise an annular trough element for sealing liquid connected to said bull gear, and a complementary cylindrical sealing element connected to said roof cooperative with said trough and sealing liquid.

3. The apparatus according to claim 1 wherein said gas sealing means comprise an annular trough element for sealing liquid connected to said bull gear, and a complementary cylindrical sealing element connected to said roof cooperative with said trough and sealing liquid, with additional gas sealing means comprising a container element for sealing liquid carried by said propeller shaft to rotate therewith and a complementary second cylindrical sealing element connected to said bull gear cooperative with said container element and with the sealing liquid.

4. The apparatus according to claim 1, with the addition of gas sealing means between said bull gear and said propeller shaft.

References Cited in the file of this patent

UNITED STATES PATENTS

| | | |
|---|---|---|
| 836,717 | Trent | Nov. 27, 1906 |
| 954,951 | Furowicz | Apr. 12, 1910 |
| 1,392,212 | Peck | Sept. 27, 1921 |
| 1,394,698 | Trent | Oct. 25, 1921 |
| 1,722,945 | Pruss | July 30, 1929 |
| 1,767,227 | Remick | June 24, 1930 |
| 1,989,589 | Fischer et al. | Jan. 29, 1935 |
| 2,488,851 | Copp | Nov. 22, 1949 |
| 2,546,650 | Nijboer | Mar. 27, 1951 |
| 2,772,233 | Nelson | Nov. 27, 1956 |

FOREIGN PATENTS

| | | |
|---|---|---|
| 582,801 | Germany | Aug. 23, 1933 |
| 852,378 | Germany | Oct. 13, 1952 |

OTHER REFERENCES

Dorr Bulletin No. 6591, entitled The Dorr Type MA Digester.